(12) United States Patent
Simuttis et al.

(10) Patent No.: US 6,663,090 B2
(45) Date of Patent: Dec. 16, 2003

(54) HYDRAULIC ENGINE MOUNT

(75) Inventors: Arnold Simuttis, Bad Kreuznach (DE); Werner Hettler, Mannheim (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/866,300

(22) Filed: May 25, 2001

(65) Prior Publication Data

US 2002/0000688 A1 Jan. 3, 2002

(30) Foreign Application Priority Data

May 30, 2000 (DE) .......................... 100 37 954

(51) Int. Cl.7 .............................. F16F 5/00; F16F 13/00
(52) U.S. Cl. ............................... 267/140.13; 267/140.11
(58) Field of Search ................... 208/140.11, 140.13, 208/140.14; 248/556, 562, 566, 636, 638

(56) References Cited

U.S. PATENT DOCUMENTS

| | | | | |
|---|---|---|---|---|
| 4,262,886 A | * | 4/1981 | Le Salver et al. ...... | 267/140.13 |
| 4,424,960 A | | 1/1984 | Dan et al. | |
| 4,880,215 A | * | 11/1989 | Katayama et al. ..... | 267/140.13 |
| 4,886,253 A | * | 12/1989 | Lun ....................... | 267/140.13 |
| 5,139,241 A | | 8/1992 | Hamaekers et al. | |
| 5,911,412 A | | 6/1999 | Durand et al. | |
| 6,199,842 B1 | * | 3/2001 | Gennesseaux et al. . | 267/140.13 |
| 6,341,766 B1 | * | 1/2002 | Stiller et al. ............ | 267/140.13 |
| 6,386,527 B2 | * | 5/2002 | Oberle ................... | 267/140.14 |

FOREIGN PATENT DOCUMENTS

| | | |
|---|---|---|
| DE | 36 18 767 | 12/1987 |
| DE | 41 41 332 | 6/1993 |
| FR | 2 587 429 | 3/1987 |
| JP | 3-144134 | 6/1991 |

* cited by examiner

*Primary Examiner*—Matthew C. Graham
(74) *Attorney, Agent, or Firm*—Kenyon & Kenyon (57) ABSTRACT

A hydramount, including a supporting bearing and a bearing member, which are supported on each other by a substantially frustoconical, first elastic spring element made of elastomeric material. The hydramount includes a working chamber and a compensating chamber, which are each filled with hydraulic fluid, are separated from each other by a partition, and are in fluid communication via a first damping opening. The supporting bearing is in the form of an internal, first supporting body, which is encircled by an external, second supporting body, at a radial distance. The first and the second supporting bodies are connected by the first elastic spring element and a second elastic spring element. The first elastic spring element and the second elastic spring element define at least two chambers filled with hydraulic fluid. The chambers are positioned transversely to the axis, substantially in diametric opposition to each other in the radial direction, and are in fluid communication via at least one second damping opening.

18 Claims, 14 Drawing Sheets

HYDRAULIC ENGINE MOUNT

FIELD OF THE INVENTION

The present invention relates to a hydraulic engine mount, i.e., a hydramount, including a supporting bearing and a bearing member, which are supported on each other by an essentially frustoconical, first elastic spring element made of an elastomer material, and including a working chamber and a compensating chamber, which are each filled with hydraulic fluid, are separated from each other by a partition, and are in fluid communication via a first damping opening.

BACKGROUND INFORMATION

Such hydramounts are described, for example, in German Published Patent Application No. 41 41 332. Conventional hydramounts are especially used as engine, gearing or transmission suspensions in motor vehicles. The action of these hydramounts is substantially axial, in the direction of the hydramount, liquid constituents being displaced back and forth through the damping opening, between the working chamber and the compensating chamber, in order to damp low-frequency, high-amplitude engine vibrations. High-frequency, low-amplitude vibrations, e.g., vibrations induced by the internal combustion engine itself, are isolated by a diaphragm, which is made of an elastomer material and is mounted inside the partition so as to be capable of vibrating.

In the radial direction of the hydramount, supporting action is substantially attained by locally hard, rubber spring segments, while isolation is provided by locally soft, rubber spring segments. This variable adjustment of the first elastic spring element to different requirements renders the cost of developing appropriate elastomer springs high. Nevertheless, the result is generally a compromise, because only the material of the elastic spring element damps in the radial direction. The choice of suitable materials is very limited since, to achieve effective axial damping action, materials that have a very low damping capability and only harden to a small extent are necessary for the first elastic spring element.

SUMMARY

It is an object of the present invention to provide a hydramount that, in addition to the improved working properties of the hydramount in the axial direction, improved working properties may also be attained in regard to the damping in the radial direction.

The above and other beneficial objects of the present invention are achieved by providing that the supporting bearing is in the form of an internal, first supporting body, which is enclosed by an external, second supporting body at a radial distance, that the first and second supporting bodies are connected by the first elastic spring element and a second elastic spring element, that the first and the second supporting bodies delimit at least two chambers filled with hydraulic fluid, and that the chambers are positioned perpendicularly to the axis, substantially in diametric opposition to each other in the radial direction, and are in fluid communication via at least one second damping opening. The hydramount according to the present invention includes the advantage of possessing, on one hand, the usual working properties with regard to the damping and the isolation of vibrations in the axial direction, and on the other hand, an improved damping effect in the radial direction, i.e., perpendicularly to the axis.

The additional configuration of the chamber pair, in which the two chambers of the chamber pair are in fluid communication via the second damping opening, also allows low-frequency, high-amplitude vibrations to be damped in the radial direction.

For example, damping in the radial direction is necessary in order to damp pitching motions of an engine mounted longitudinally in a motor vehicle. Engine shaking motions in transversely mounted engines may also be effectively damped by the hydramount damping that acts in the radial direction. Depending on the particular application case and the design of the second throttle opening, there is also the possibility of isolating shaking motions of the engine, using an absorption effect. The dynamic reduction in stiffness caused by the absorption effect allows comparatively high radial spring constants for supporting the engine in the direction of travel, e.g., while accelerating and braking, which is very improved for the driving comfort.

Engine shaking motions in engines mounted longitudinally in motor vehicles may be damped by the hydramount according to the present invention, in the transverse direction of the vehicle, or they may be isolated by an absorption effect when the second damping opening is appropriately designed. In the case of absorbing vibrations, the cornering performance of a motor vehicle can be improved by a higher static spring constant. That is, the engine does not strike the end stop too early in the radial direction, which means that the noise is minimized, and reverberation, e.g., post-vibration of the engine is prevented in the transverse direction.

Therefore, the improved working properties result from integrating at least one additional chamber pair, e.g., in the form of a hydraulic sleeve, into a conventional hydramount, the additional chamber pair acting in the radial direction.

The second supporting body and the bearing member may be formed from a uniform material and/or may be formed in one piece. The one-piece design allows the hydramount to be manufactured inexpensively and to be assembled from a small number of parts. However, if the second supporting body and the bearing member are formed in two pieces, then undercuts may be produced in the radial direction. When removing the part from the vulcanization tool, neither the part itself nor the tool is damaged/destroyed.

The first and the second elastic spring elements may be formed in one piece or multiple pieces. The one-piece design of the two elastic spring elements allows the hydramount to be manufactured easily and inexpensively, the choice of material depending mainly on the required spring stiffnesses of the elastic spring elements.

For example, the first damping opening may be designed in the shape of a channel and may form the circumference of the partition. In this connection, it may be advantageous that the comparatively large channel length of the damping opening allows a large mass of fluid to vibrate back and forth between the working chamber and the compensating chamber and therefore allows low-frequency, high-amplitude vibrations to be damped effectively.

The second damping opening may be in the form of a choke, a throttle or an absorption channel. If the second damping opening is in the form of a throttle, the radially induced vibrations are damped by forcing hydraulic fluid between the chambers of the chamber pairs, through the second damping opening having a comparatively small cross-section. A condition for the throttle damping is that the chamber walls should be very resistant to inflation. This is achieved by short, thick spring segments made of elastomer.

The second damping opening may also be in the form of an absorption channel. In this context, the length of the damping opening is small, and its cross-section is large, in order to attain a dynamic stiffness in the frequency range of 20 to 80 Hz, which is lower than the static stiffness. A plurality of absorption channels may be arranged in a functionally parallel circuit.

The first and the second elastic spring elements may define two chamber pairs, which are positioned adjacently to each other in the axial direction, the chambers of each chamber pair being positioned transversely to the axis, substantially in diametric opposition to each other in the radial direction, and being in fluid communication with each other, and the chamber pairs being positioned so as to be offset 90° from each other. Vibrations may be damped in all three spatial directions. In the application case of a motor vehicle, this means that vibrations may be damped in the travel direction, transversely to the travel direction, and perpendicularly to the road surface. In this case, the degree of undesirable vibration transmission, e.g., into the passenger compartment of the motor vehicle, is particularly small.

The second elastic spring element may be disposed on the side of the first elastic spring element facing away from the working chamber. The first elastic spring element, the supporting bearing, the bearing member, and the partition delimit the working chamber. This arrangement allows a high degree of damping in the axial direction of the hydramount, since, due to the higher spring stiffness in comparison with the second elastic spring element, the first elastic spring element's pumping action on the hydraulic fluid in the working chamber is improved.

However, in general, there is also the possibility of positioning the second elastic spring element on the side of the first elastic spring element facing the working chamber. The arrangement of the second elastic spring element inside the hydramount reliably protects the thinner, second elastic spring element from outside influences. This arrangement minimizes the danger of being damaged. The chambers of the chamber pair, which are filled with hydraulic fluid, are disposed in the axial space between the two elastic spring elements.

The second elastic spring element may substantially be formed in the shape of a rolling diaphragm. In response to elastic deflection and rebounding in the axial direction, and in response to the inner supporting body being radially shifted with respect to the outer supporting body, tensile stresses inside the second elastic spring element, which are harmful and reduce the service life, are reliably prevented by the rolling-diaphragm-shaped design of the second elastic spring element. In this manner, the hydramount exhibits uniformly improved working properties during a long service life.

When viewed in longitudinal section, the second elastic spring element has a smaller sectional area than the first elastic spring element. For safety reasons, the part-rubber, part-metal construction may include a rigid, conical first elastic spring element, which may bear the static loading alone. In conjunction with the inflation resistance of the first elastic spring element, the second elastic spring element includes the necessary inflation resistance for the damping/absorption in the radial direction of the hydramount.

The second damping opening may be radially positioned between the second supporting body and the chambers. Because the second damping opening for the radial action of the hydramount may be situated in the region of the outer supporting body, the large length of the damping opening and a large cross-section may generate a high degree of damping at a low volumetric stiffness of the chambers. In this manner, the degree of dynamic hardening of the hydramount remains low. The second damping opening may be situated in the region of the chambers, either with or without additional component parts. In addition, there is the possibility of directing the channels underneath the chambers, between the outer supporting body and the bearing member.

According to another aspect of the present invention, there is the possibility of radially positioning the second damping opening between the first supporting body and the chambers. In this case, the length of the second damping opening may be comparatively small, and its cross-section may be large, in order to absorb vibration. In the case of vibration absorption in a frequency range of 20 to 80 Hz, a dynamic stiffness is achieved that is less than the static stiffness.

Spring configurations, which have a first and a second elastic spring element and chambers between them, and provide damping in the radial direction by means of openings, may also be combined with a third opening between the axially acting working chamber and the compensating chamber, a first control element opening or closing this third opening as a function of the operating state of the vehicle. Opening it causes a mass of liquid to vibrate in the opening, which has the effect of hydraulically absorbing vibration in order to reduce the dynamic stiffness of the mount in the axial direction. In this context, the adjusting element may operate electrically, as well as hydraulically or pneumatically.

Closing the third opening produces the action of a conventional, hydraulically damping mount, along with the advantage of radial damping.

A prerequisite for the above-mentioned absorbing action is either a rigid wall between the working chamber and the compensating chamber, or at least a supported, but inflatable or expandable diaphragm between two grating regions. To improve the acoustics, it may be advantageous to position this diaphragm between the gratings so as to be able to move. Using a movable grating, the diaphragm must then be clamped when the third opening is open and be provided with free space when the third opening is closed.

The freely movable diaphragm allows the dynamic stiffness to be reduced considerably in the acoustically active frequency range.

The movable grating may be actuated by the first control element, which also releases the third opening.

Since hydraulically damping mounts in motor vehicles are normally set at an angle when they are installed, and idling internal combustion engines not only undergo movements in the cylinder direction, but also in the direction perpendicular to it, it may be advantageous to isolate these as well, in order to provide improved vibrational comfort. In order to achieve this result, either a short channel is connected to the damping channel between the radially acting chambers, between the first and second elastic spring elements, or the channel is shortened. This arrangement may be achieved by a second control element, which operates electrically, pneumatically, or hydraulically.

DETAILED DESCRIPTION

Six different hydramounts are illustrated in FIGS. 1 to 14, radially acting chambers 12, 13, 19, 20 of chamber pairs 11, 18 being integrated into the illustrated hydramounts.

Each of the hydramounts illustrated includes a supporting bearing 1 and a bearing member 2, which are supported on each other by a substantially frustoconical, first elastic spring element 3 made of elastomeric material. First elastic spring element 3 is in the form of a bearing spring and, in comparison with second elastic spring element 10, has a higher spring stiffness, e.g., due to being dimensioned thicker.

Each hydramount has a working chamber 4 and compensating chamber 5, working chamber 4 and compensating chamber 5 being in fluid communication via a channel-shaped, first damping opening 7. In the example embodiments illustrated, damping opening 7 extends in the region of the circumference of partition 6, in order to accommodate as large a mass of hydraulic fluid as possible inside damping opening 7. The large length of channel-shaped damping opening 7 and the large cross-section allow high-amplitude, low-frequency vibrations to be damped effectively, in that the hydraulic fluid inside damping opening 7 is set into a countervibration, which is phase-shifted with respect to the introduced vibration.

Figure 1:
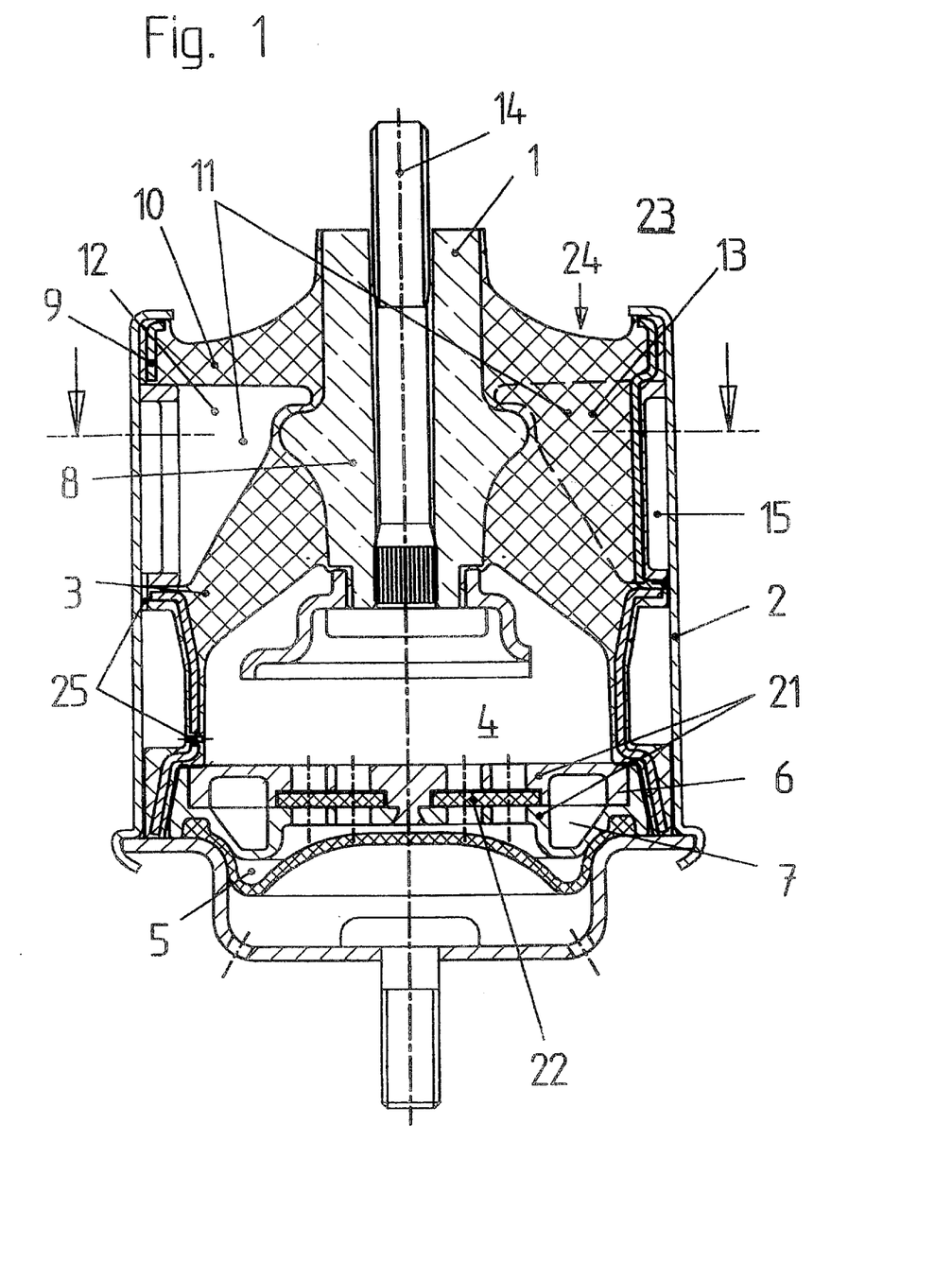
FIG. 1 illustrates a first example embodiment of a hydramount, having a channel-shaped, second damping opening.
Figure 3:
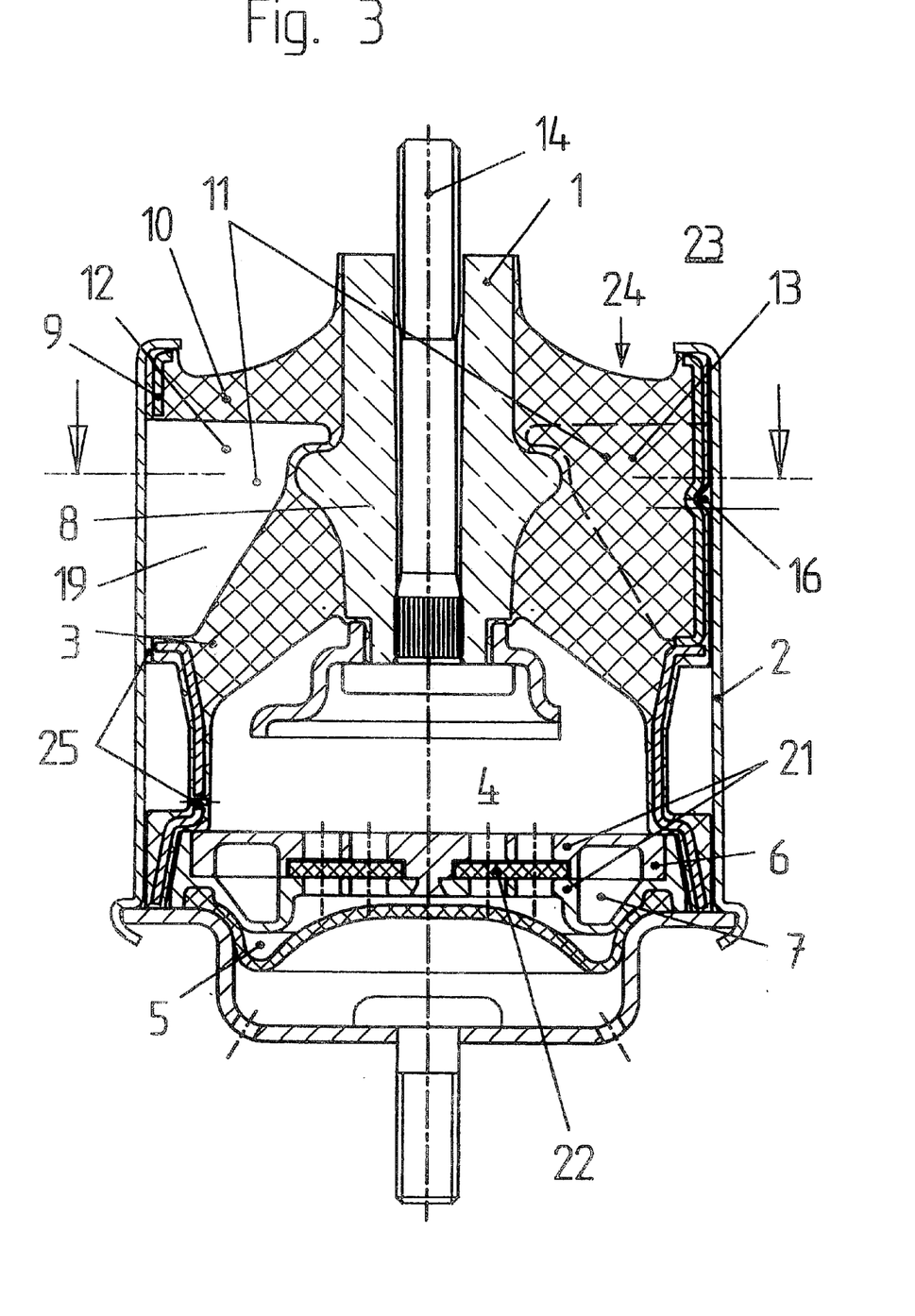
FIG. 3 illustrates a second example embodiment of a hydramount, the second damping opening being in the form of a throttle opening.
Figure 5:
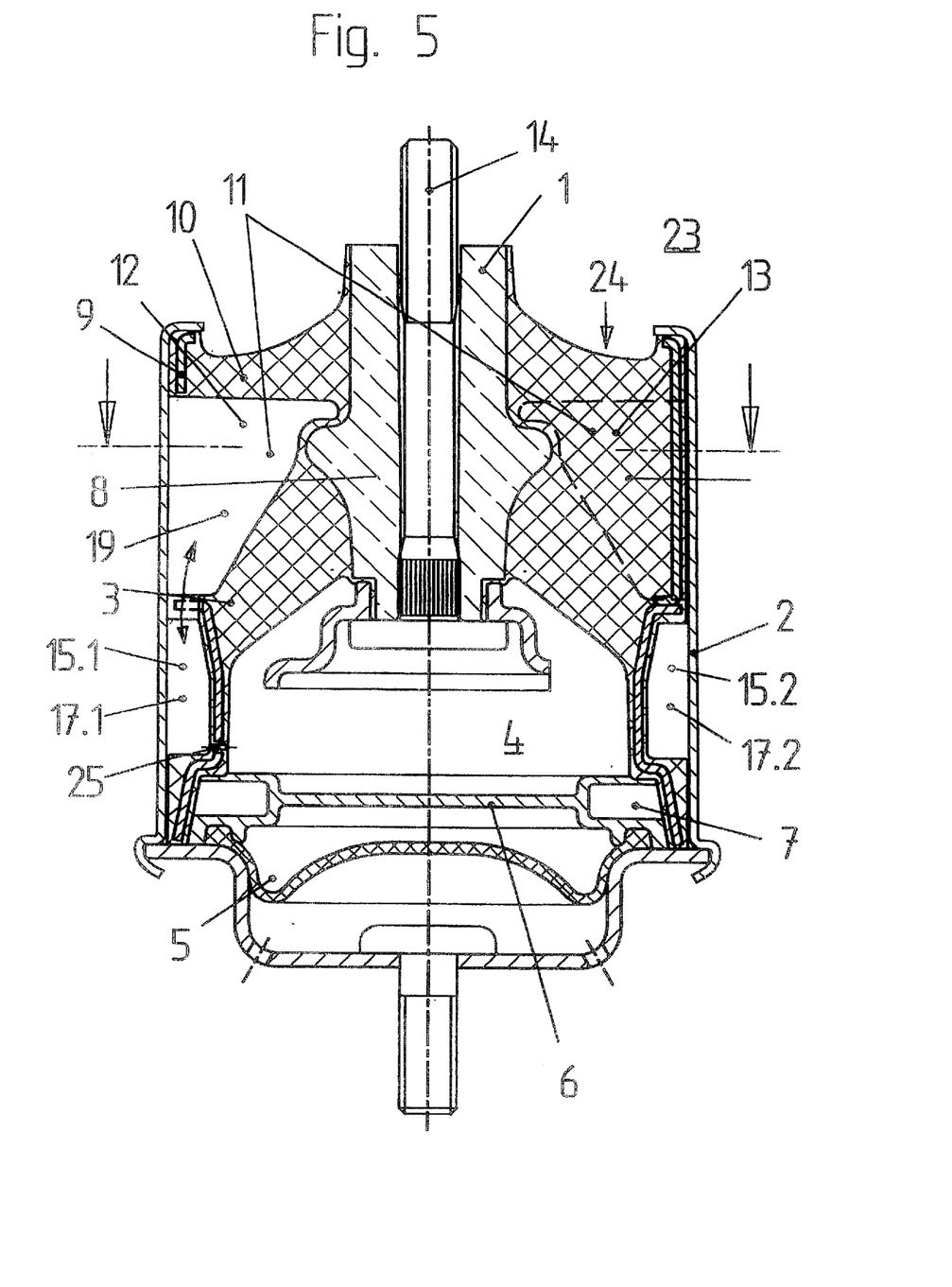
FIG. 5 illustrates a third example embodiment of a hydramount, in which the second damping opening is formed by two channels arranged in parallel, in order to absorb vibrations, the two channels being formed by a supporting bearing, in particular its outer supporting body, and the bearing member.

As illustrated in FIGS. 1 and 3, partition 6 is formed by a two-piece nozzle cage, a latticed central region 21 being provided in the center of partition 6. To isolate high-frequency, low-amplitude vibrations, a diaphragm 22 is positioned or mounted inside partition 6, so as to be completely or substantially fluid-tight, depending on the specific application. First damping opening 7 is hydraulically blocked during the isolation of high-frequency, low-amplitude vibrations. As illustrated in FIG. 5, partition 6 may be constructed in one piece, and in the central region, it may be designed to be completely rigid and fluid-tight.

Figure 7:
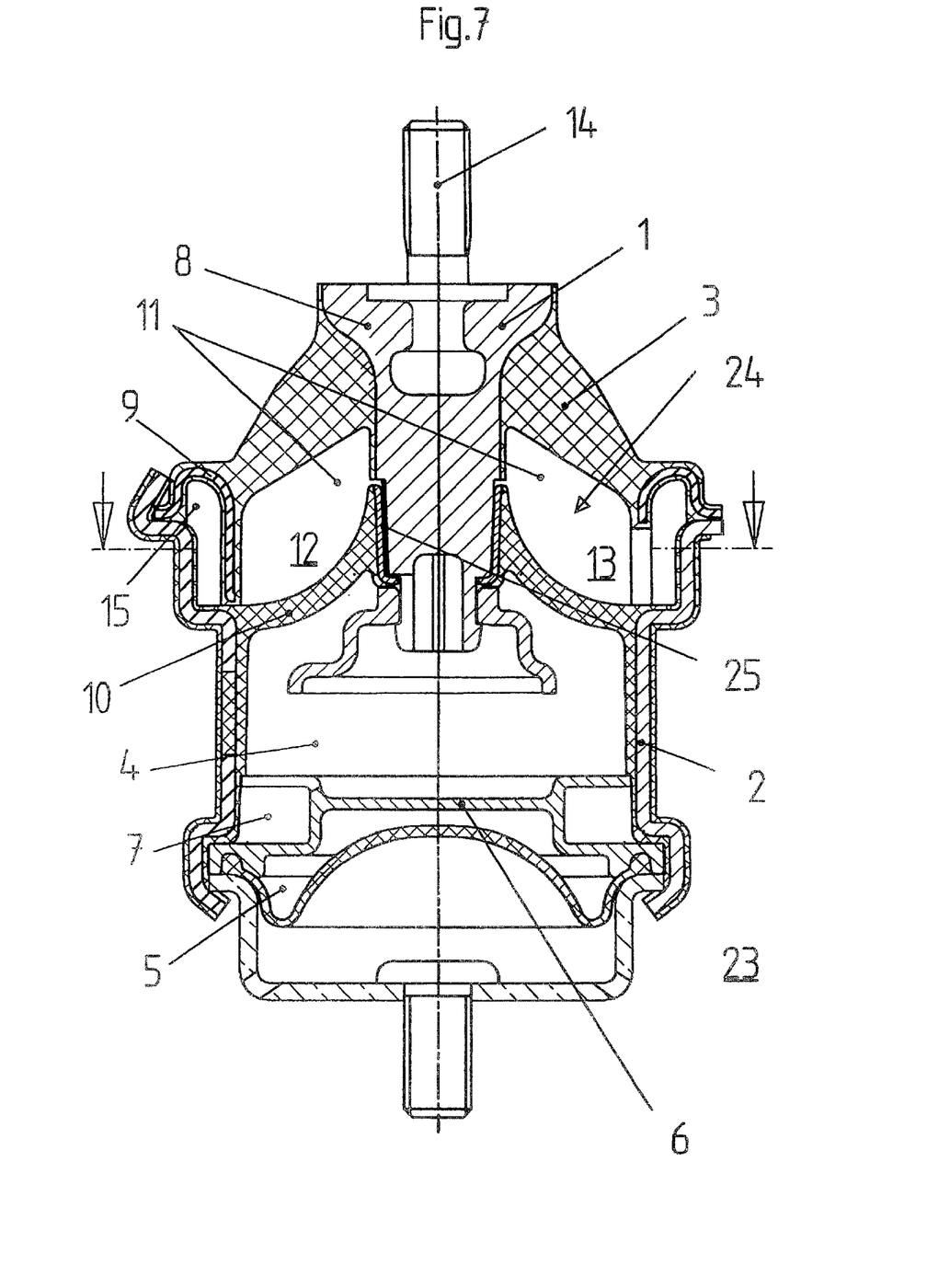
FIG. 7 illustrates a fourth example embodiment of a hydramount, only one chamber pair being provided for reducing the radial vibrations.
Figure 9:
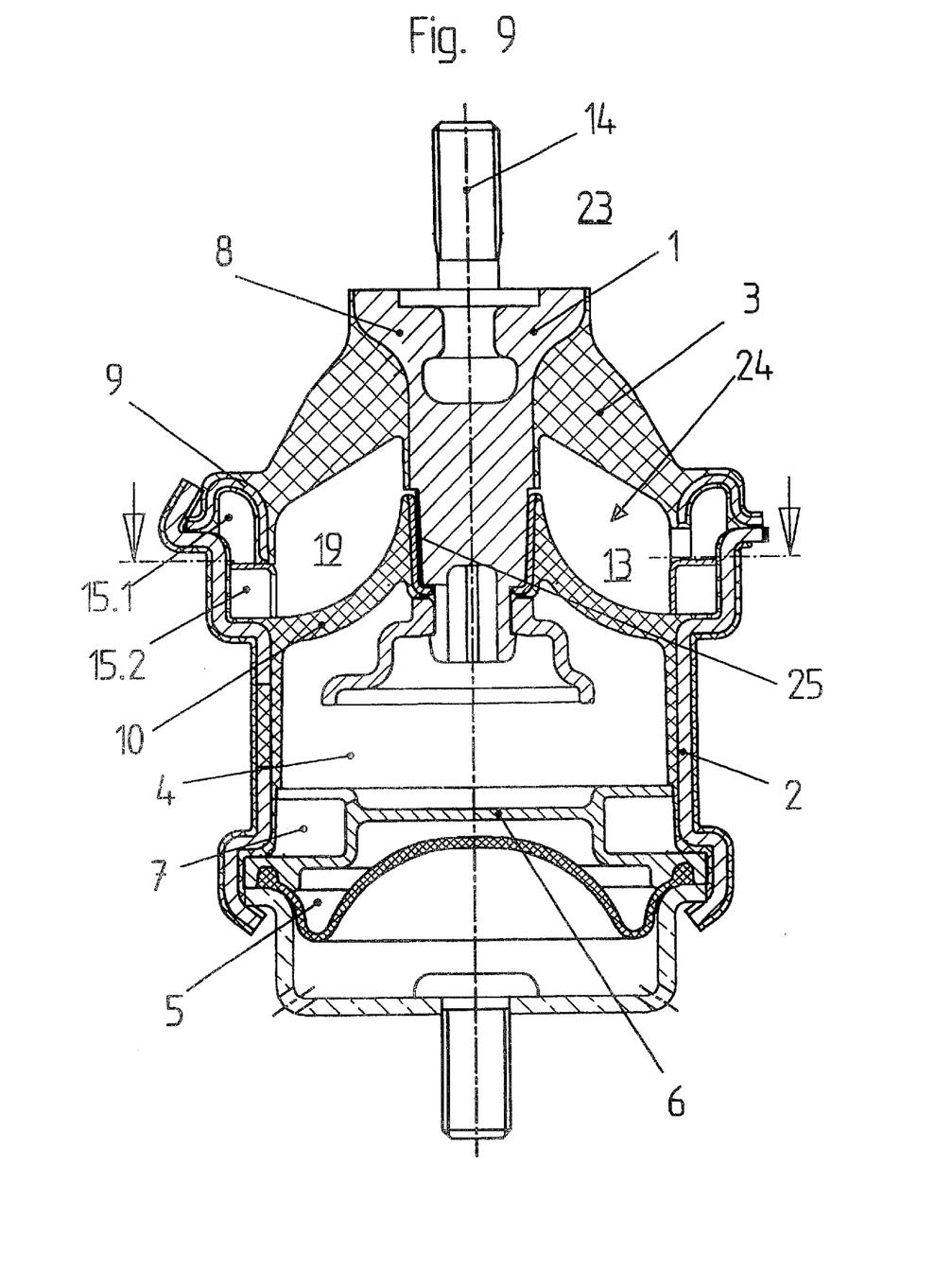
FIG. 9 illustrates a fifth exemplary embodiment of a hydramount, in which two chamber pairs are provided for reducing radial vibrations.

The two example embodiments illustrated in FIGS. 7 and 9 do not differ from the foregoing example embodiments in regard to the damping of low-frequency, high-amplitude vibrations. In this case, low-frequency, high-amplitude vibrations are also damped by the reciprocating movement of the liquid material situated in channel-shaped, first damping opening 7. In contrast, higher-frequency, low-amplitude vibrations in these example embodiments are isolated by a diaphragm 22, which forms a component of the partition between working chamber 4 and surroundings 23. Membrane 22 is made of an elastomer material, is radially covered on the inside by the elastomer material of second elastic spring element 10, is radially covered on the outside by the rubber coating of bearing member 2, and may therefore vibrate in the radial direction.

In addition to the above-described hydramount function, the hydramounts illustrated in FIGS. 1 to 10 provide damping in the radial direction. To this end, supporting bearing 1 is in the form of an inner supporting body 8, which is encircled by an outer, second supporting body 9, at a radial distance. Not only first elastic spring element 3, but also second elastic spring element 10 are arranged in gap 24 formed by the clearance. Together with inner supporting body 8 and outer supporting body 9, the two elastic spring elements 3, 10 define a chamber pair 11 filled with hydraulic fluid. Chamber pair 11 includes at least two chambers 12, 13, which are positioned transversely to axis 14, substantially in diametric opposition to each other in the radial direction, the two chambers 12, 13 being in fluid communication with each other via second damping opening 15. A chamber pair 11 having chambers 12, 13 is shown in the example embodiments illustrated in FIGS. 3 and 7.

In contrast, two chamber pairs 11, 18, which each have two chambers 12, 13 and 19, 20, respectively, are illustrated in the example embodiments illustrated in FIGS. 1, 5 and 9.

The hydramount includes an integrated, hydraulically damping, rubber-spring sleeve for damping or absorbing vibrations introduced into the hydramount in the radial direction. Vibrations may be damped/absorbed in a plurality of radial directions, as a function of the number of chamber pairs and their geometric configuration with respect to each other. As illustrated in FIGS. 1, 5 and 9, chamber pairs 11, 18 are positioned adjacently to each other in the axial direction. Chambers 12, 13, 19, 20 of each chamber pair 11, 18 are positioned perpendicularly with respect to axis 14, substantially in diametric opposition to each other in the radial direction, and are in fluid communication, chamber pairs 11, 18 being offset 90° with respect to each other. The 90° offset of chamber pairs 11, 18 with respect to each other and the additional action of the hydramount in the axial direction renders the hydramount capable of damping/absorbing vibrations in all spatial directions.

In all of the example embodiments of the present invention, second supporting body 9 and bearing member 2 are designed in two pieces and are fastened to each other in a fluid-tight manner.

As illustrated in FIGS. 1, 3, 5 and 11, the two elastic spring elements 3, 10 are formed in one piece from a uniform material and are vulcanized to inner, first supporting body 8.

The first example embodiment of a hydramount is illustrated in FIG. 1. First elastic spring element 3 is in the form of a bearing spring, and is designed to be stronger or thicker than second elastic spring element 10. Second elastic spring element 10 is arranged on the side of the first elastic spring element facing away from working chamber 4. Since working chamber 4 is delimited by first elastic spring element 3, which is in the form of a bearing spring, and first elastic spring element 3 has relatively large inflation resistance in comparison with second elastic spring element 10, the hydramount provides effective damping in the axial direction. Chambers 12, 13 of first chamber pair 11 are interconnected by second damping opening 15. Second chamber pair 18 includes chambers 19 and 20. Openings 25 are provided with very small cross sections for equalizing static pressure, in order to prevent elastic spring elements 3, 10 from being subjected to unacceptably high pressures. Openings 25 connect second chamber pair 18 with working chamber 5.

Figure 2:
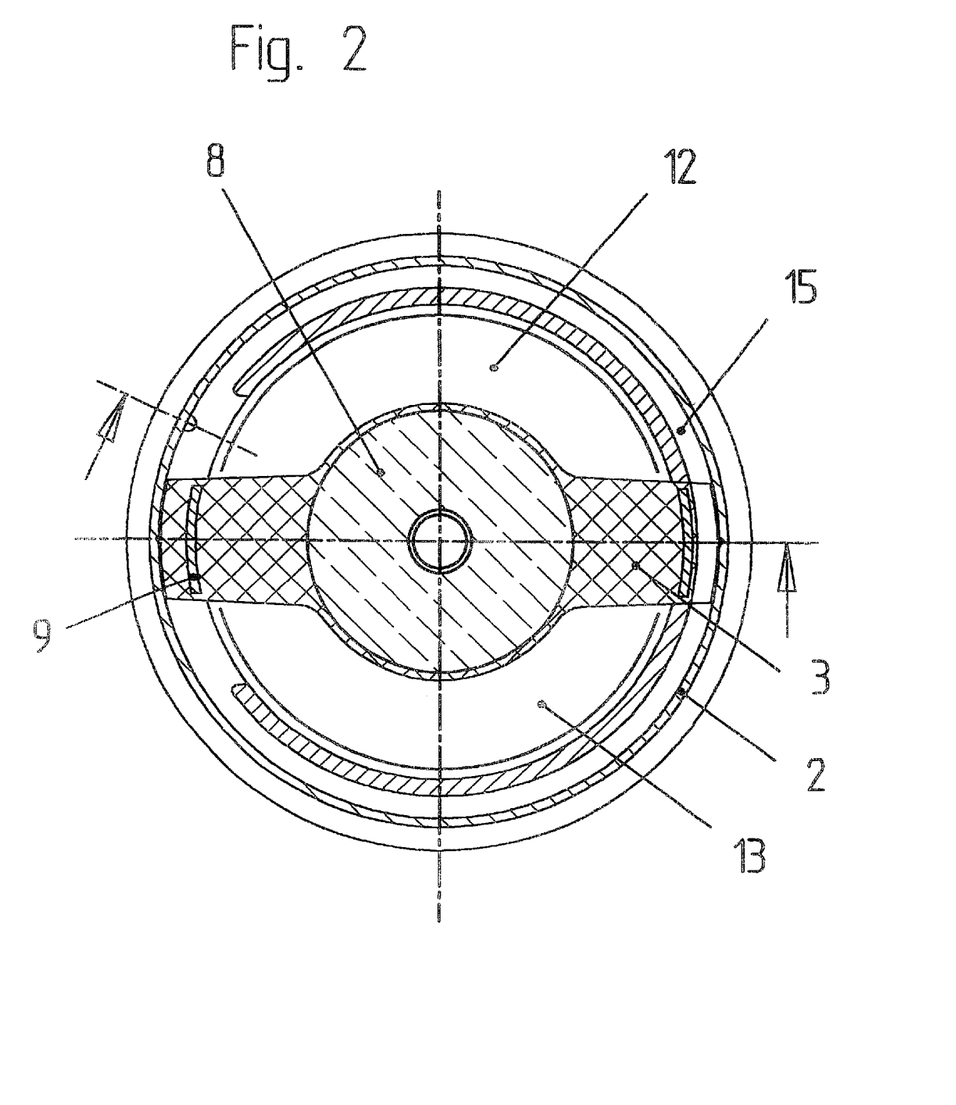
FIG. 2 is a cross-sectional view of the hydramount illustrated in FIG. 1.

FIG. 2 is a cross-sectional view of the hydramount illustrated in FIG. 1.

A second example embodiment of a hydramount is illustrated in FIG. 3. The hydramount illustrated in FIG. 3 differs from the above-mentioned hydramount illustrated in FIG. 1, in that only one chamber pair 11 having chambers 12, 13 is provided, which are interconnected by second damping opening 15. Second damping opening 15 is in the form of a throttle opening and is positioned in the radial direction between second supporting body 9 and chambers 12, 13. The throttle opening includes a small cross-section, through which hydraulic fluid is pressed from chamber 12 into chamber 13 and back again, in order to damp radial vibrations.

Figure 4:
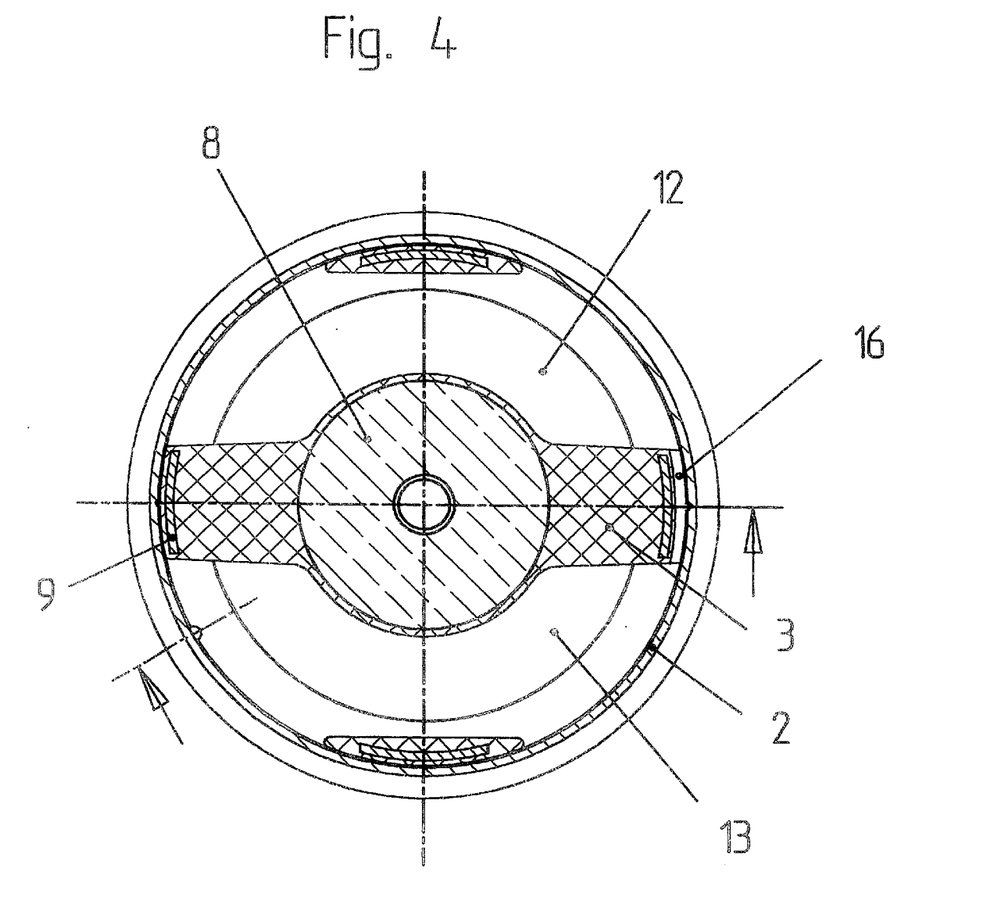
FIG. 4 is a cross-sectional view of the hydramount illustrated in FIG. 3.

FIG. 4 is a cross-sectional view of the hydramount illustrated in FIG. 3, having the throttle opening between the two chambers 12, 13.

FIG. 5 illustrates a third example embodiment of a hydramount, which differs from the two aforementioned example embodiments in that the second damping opening is made of two channels 17 functionally connected in parallel, in order to absorb radially introduced vibrations. The cross-section of the damping openings in this example embodiment is considerably larger than that of throttle-shaped damping opening 15 described above. In response to the initiation of radial vibrations, the hydraulic fluid arranged inside second damping opening 15 including the two subopenings 15.1 and 15.2, vibrates back and forth between chambers 12, 13, out of phase with the radial vibrations and, in this manner, absorbs the initiated vibrations.

Figure 6:
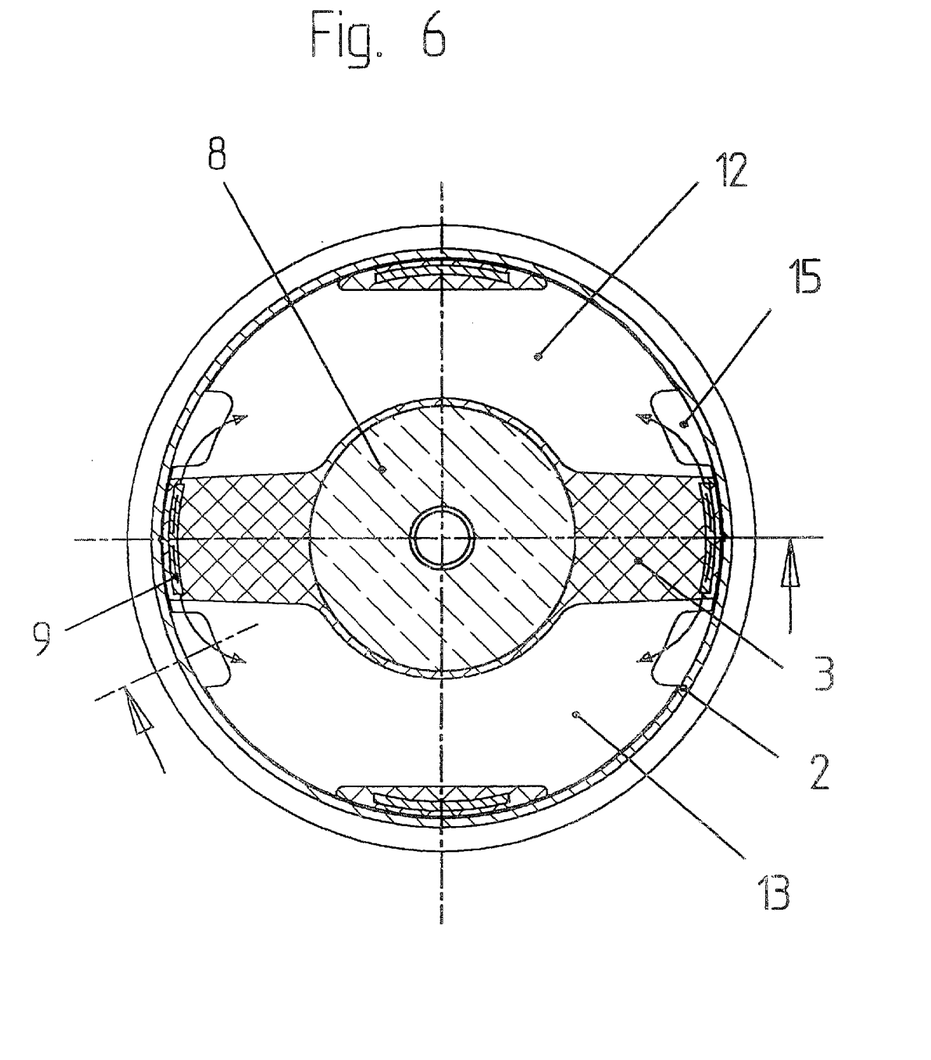
FIG. 6 is a cross-sectional view of the hydramount illustrated in FIG. 5.

The cross-section of two-part, second damping opening 15, 15.1, 15.2 is illustrated in FIG. 6.

A fourth example embodiment of the hydramount is illustrated in FIG. 7. It differs from the previously described example embodiments in that more weakly designed, second elastic spring element 10 is arranged on the side of first elastic spring element 3 facing working chamber 4. Second elastic spring element 10 is substantially formed in the shape of a rolling diaphragm. This arrangement prevents undesirably high mechanical loading of second elastic spring element 10 in response to supporting bearing 1 being axially displaced relatively to bearing member 2. The two chambers 12, 13 of chamber pair 11 are interconnected by second damping opening 15.

Figure 8:
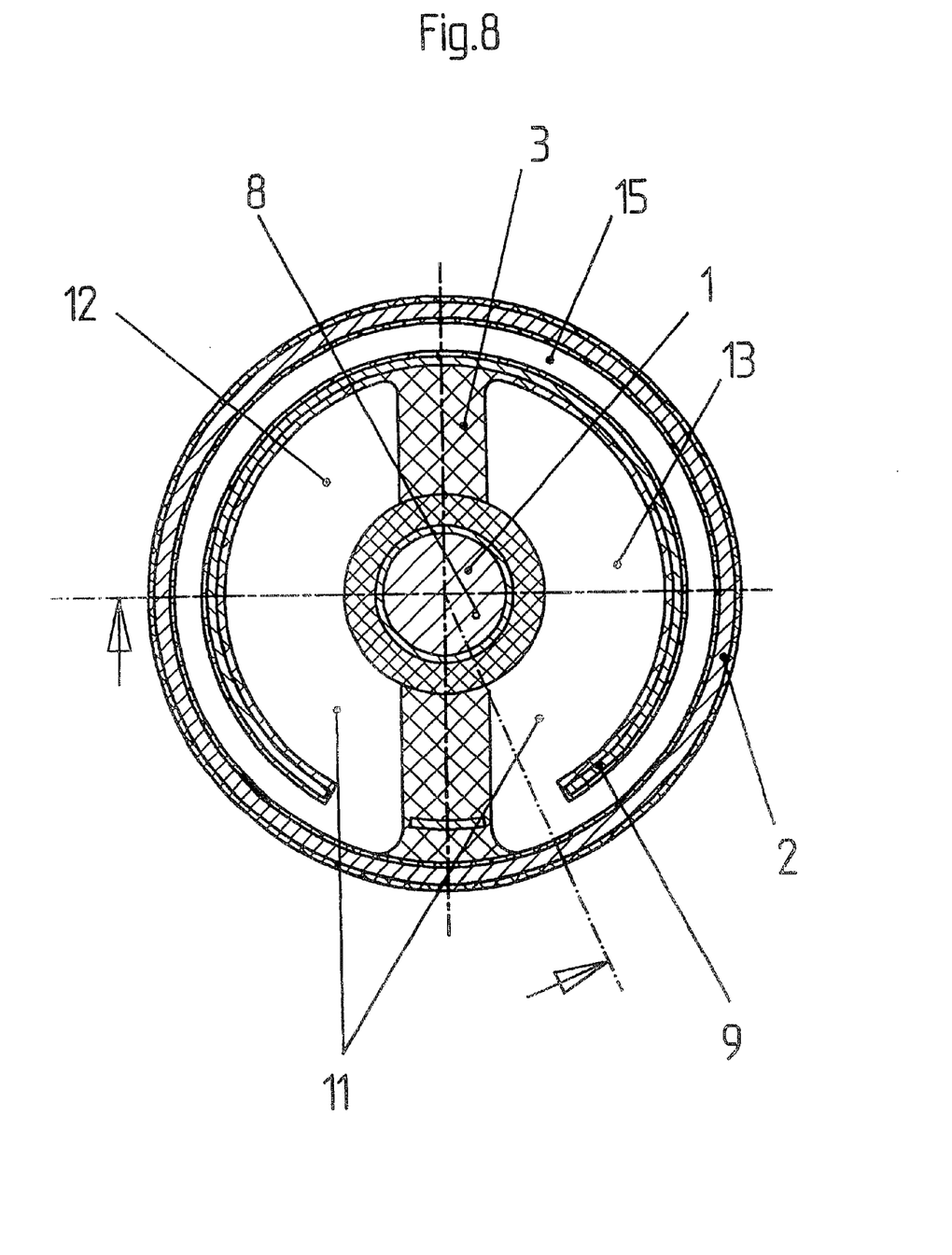
FIG. 8 is a cross-sectional view of the hydramount illustrated in FIG. 7.

FIG. 8 is a cross-sectional view of the hydramount illustrated in FIG. 7. Second damping opening 15 is formed in the shape of a channel and extends along almost the entire circumference of the hydramount. The radially introduced vibrations are damped by the phase-shifted, back-and-forth movement of the hydraulic fluid arranged inside second damping opening 15.

The fifth example embodiment of a hydramount, illustrated in FIG. 9, differs from those previously described, in that two chamber pairs 11, 18 having their respective chambers 12, 13, 19, 20 are positioned one behind the other in the axial direction.

Figure 10:
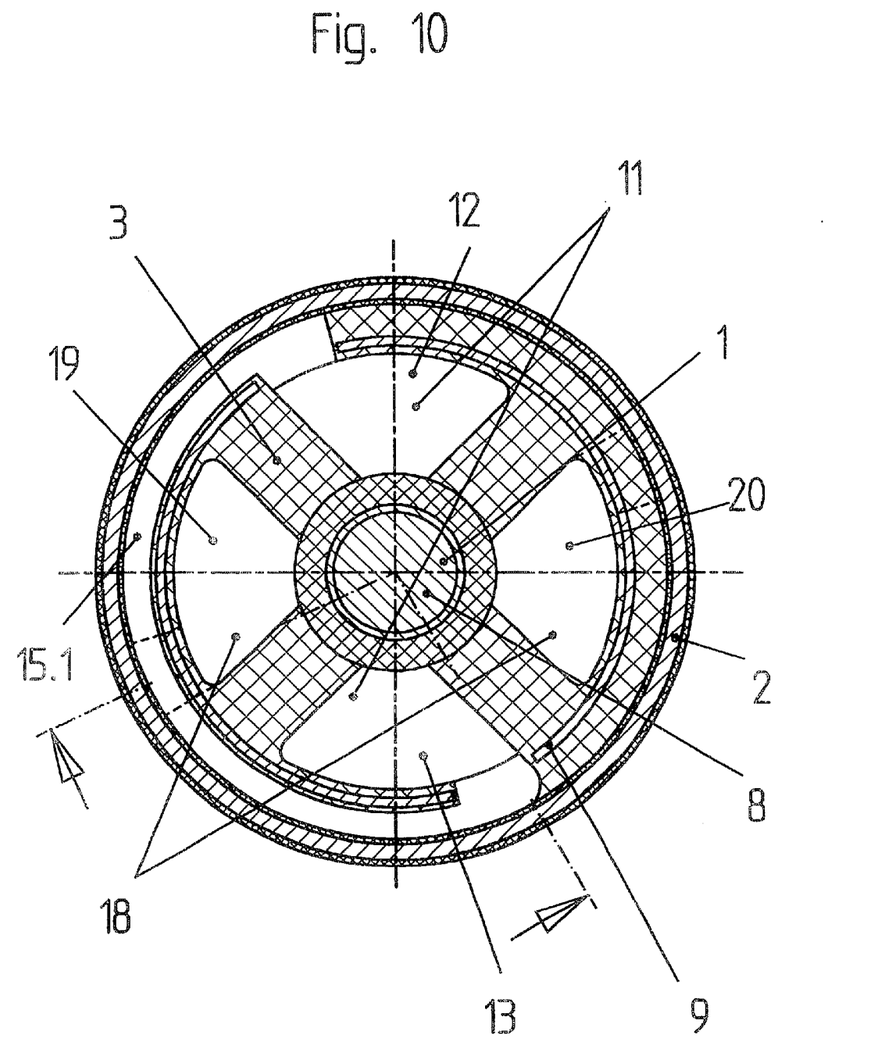
FIG. 10 is a cross-sectional view of the hydramount illustrated in FIG. 9.

FIG. 10 is a cross-sectional view of the hydramount illustrated in FIG. 9. Chambers 12, 13; 19, 20 of each chamber pair 11, 18 are positioned transversely to axis 14, essentially in diametric opposition to each other in the axial direction, and are in fluid communication with each other, chamber pairs 11, 18 being offset 90° from each other. This hydramount damps vibrations in all three spatial directions.

Figure 11:
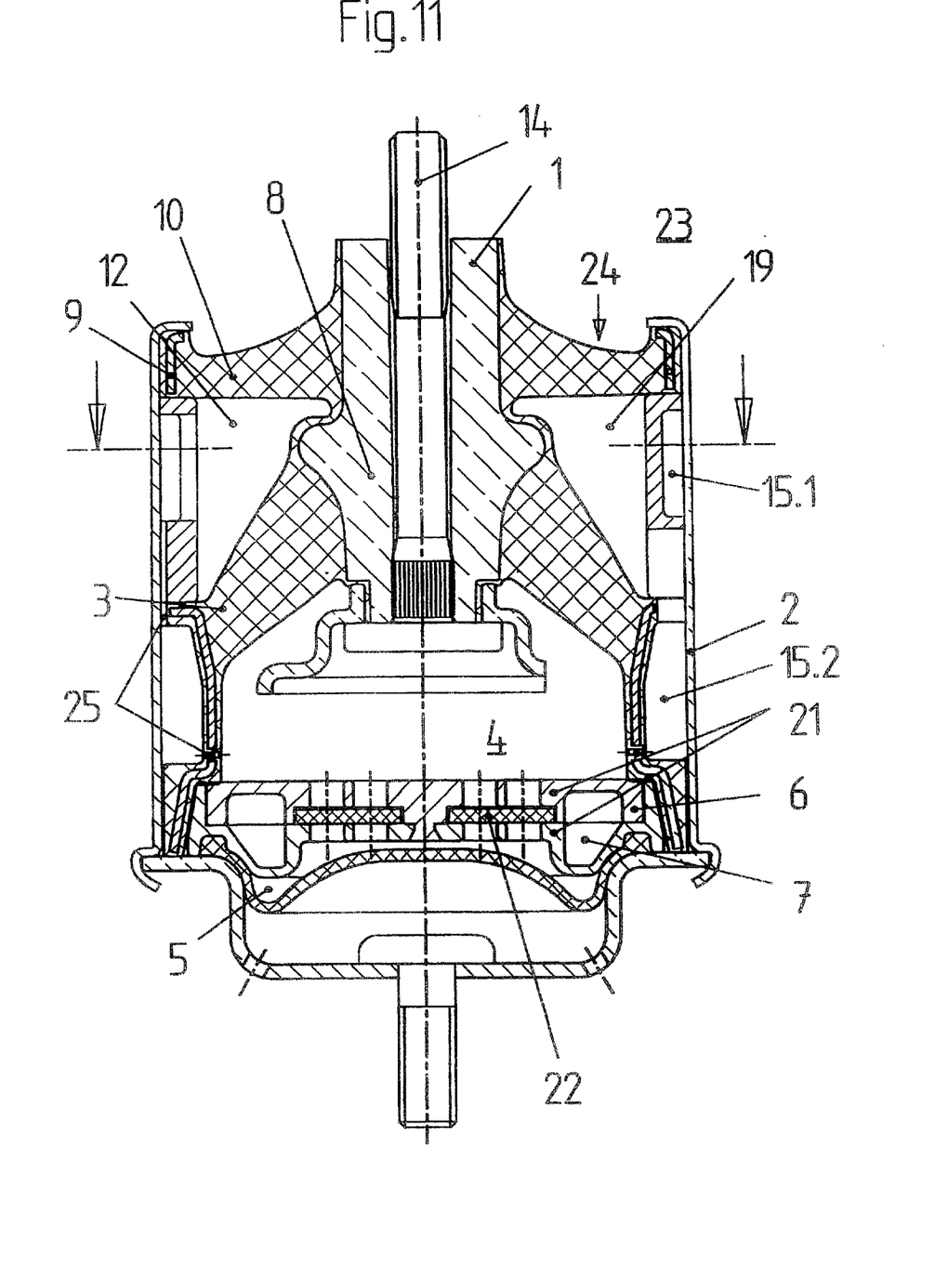
FIG. 11 illustrates a variant of the fifth embodiment illustrated in FIG. 9 having a one-piece construction of the first and second elastic spring elements, as well as grating regions and a diaphragm.
Figure 12:
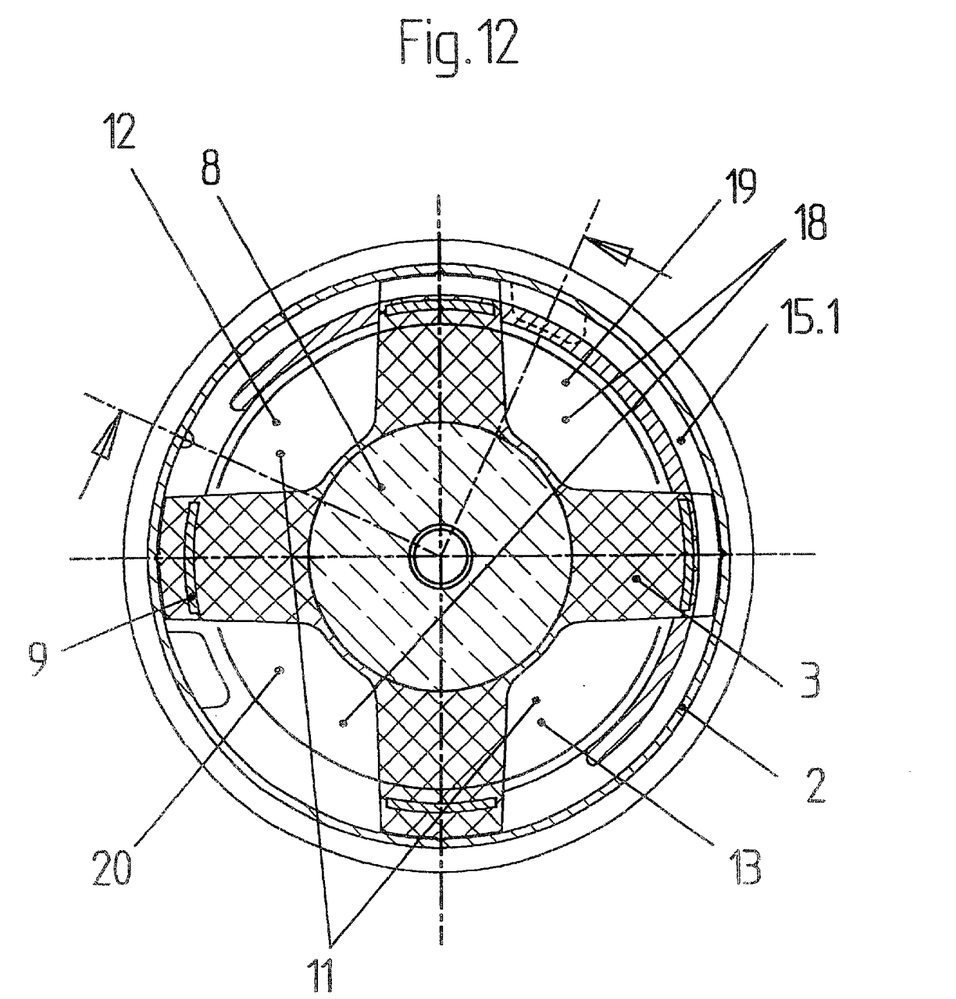
FIG. 12 is a cross-sectional view of the hydramount illustrated in FIG. 11.

As illustrated in FIG. 11 and FIG. 12 (cross-section of FIG. 11), the four radially acting chambers 12, 13, 19, 20 are represented in a spring combination having internal, first elastic spring element 3, external, second elastic spring element 10, and a decoupling system including grating region 21 and diaphragm 22. This combination produces triaxial damping with particularly improved pumping action in the axial damping, and the decoupling system prevents low-frequency humming.

Figure 13:
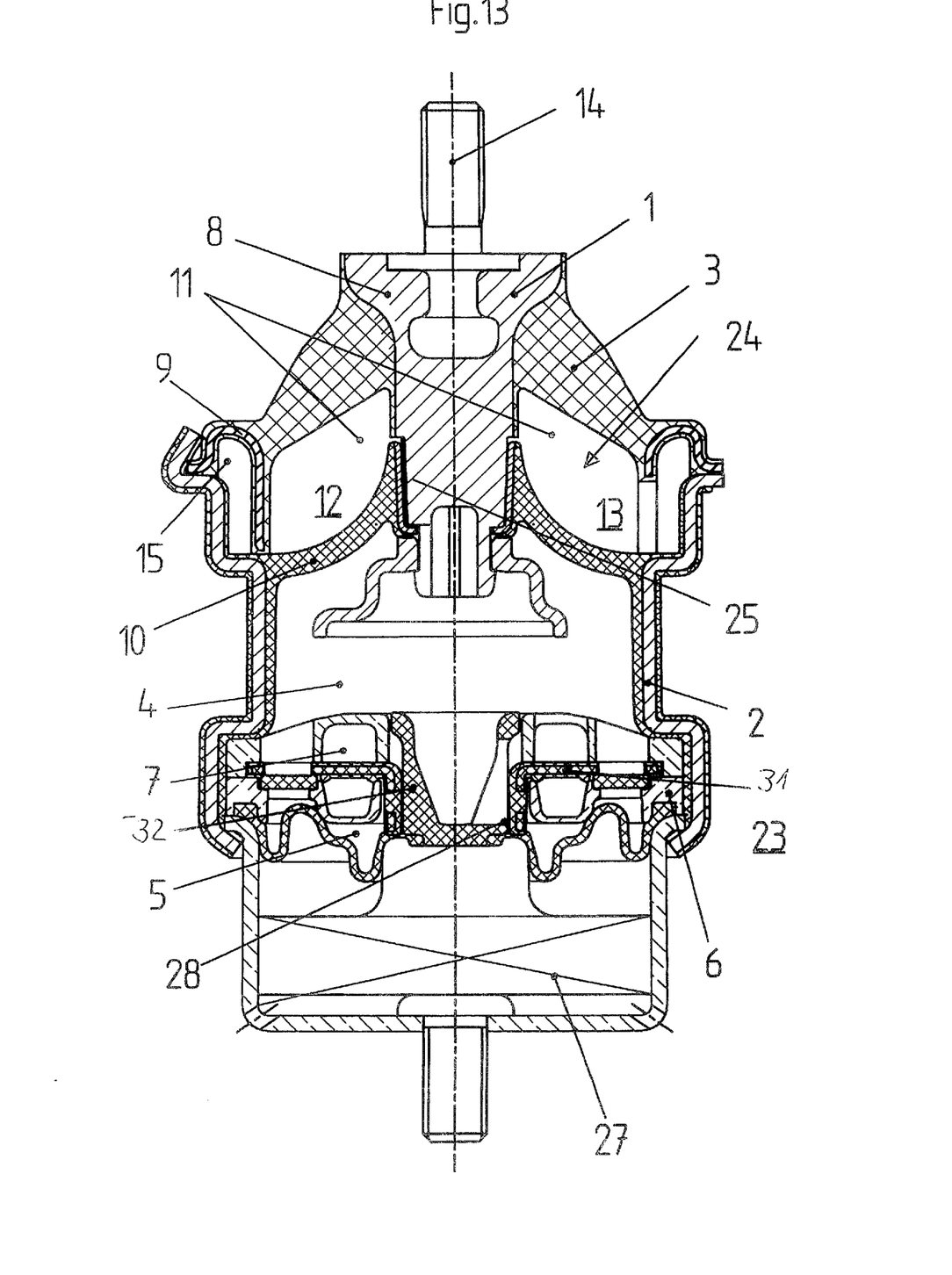
FIG. 13 illustrates switchable mounts, where there is the possibility of switching the axial and radial characteristics.

FIG. 13 illustrates that a mount of the above-mentioned design may also be constructed to be switchable with regard to the axial characteristics. In this context, an additional opening 28 is opened or closed by an electrical, hydraulic, or pneumatic, first control element 27. For example, this is used while a motor-vehicle engine is idling, in order to reduce the dynamic stiffness in the axial direction, by opening this bypass 28.

Using a second control element 29, the length of second damping opening 15 may also be decreased by a second bypass 30 so that an absorption effect of the small length is created from the damping opening of the large length. Consequently, the axial absorption may be supplemented by radial absorption, and, for example, shaking of the engine may be isolated in a particularly effective manner.

Figure 14:
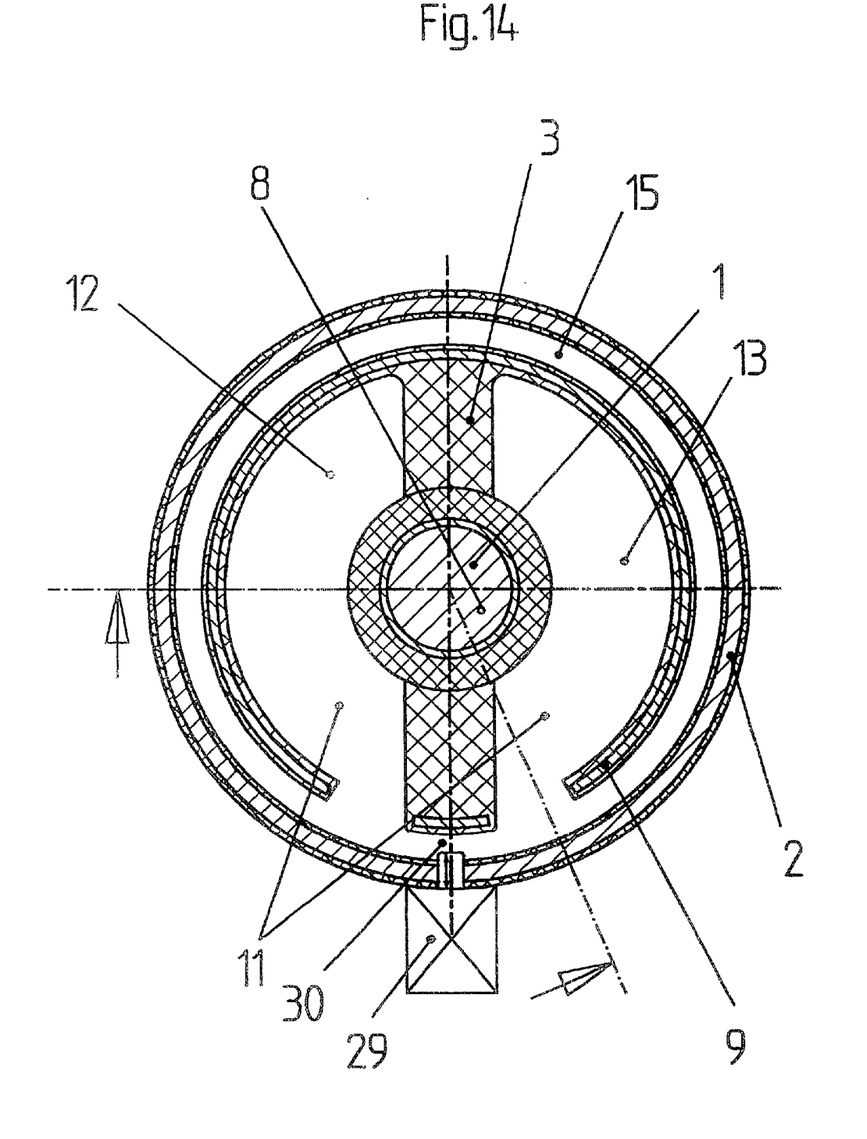
FIG. 14 illustrates a bypass in the radial direction.

A second bypass 30 is provided as illustrated in FIG. 14, second control element 29 being able to close second bypass 30, or bring it into the open position, as needed. By actuating second control element 29, the opening cross-section of bypass 30 may be adjusted to the particular conditions of the application, thereby producing an absorption effect in the radial direction.

What is claimed is:

1. A hydramount, comprising:
   a supporting bearing in the form of an internal first supporting body;
   an external second supporting body placed at a radial distance from the first supporting body, wherein the first supporting body is positioned at least in part in a volume defined by external edges of the second supporting body;
   a bearing member;
   a substantially frustoconical, first elastic spring element formed of elastomeric material, the supporting bearing and the bearing member being supported on each other by the first elastic spring element;
   a second elastic spring element;
   a working chamber; and
   a compensating chamber, the working chamber and the compensating chamber being filled with hydraulic fluid, being separated from each other by a partition and being in fluid communication via a first damping opening;

wherein the first supporting body and the second supporting body are connected by the first elastic spring element and the second elastic spring element, the first elastic spring element and the second elastic spring element delimiting at least two chambers filled with hydraulic fluid, the at least two chambers being positioned transversely to an axis, substantially in diametric opposition to each other in a radial direction, and being in fluid communication via at least one second damping opening.

2. The hydramount according to claim 1, wherein the second supporting body and the bearing member are formed at least one of from a uniform material and in one piece.

3. The hydramount according to claim 1, wherein the first elastic spring element and the second elastic spring element are formed at least one of from a uniform material and in one piece.

4. The hydramount according to claim 1, wherein the first damping opening is formed in the shape of a channel.

5. The hydramount according to claim 1, wherein the second damping opening is in the form of one of a choke and a throttle.

6. The hydramount according to claim 1, wherein the second damping opening is in the form of an absorption channel.

7. The hydramount according to claim 1, wherein the first elastic spring element and the second elastic spring element delimit two chamber pairs positioned adjacently to each other in an axial direction, the chambers of each chamber pair being positioned transversely to the axis, substantially in diametric opposition to each other in the radial direction and being in fluid communication, the chamber pairs being offset 90° from each other.

8. The hydramount according to claim 1, wherein the second elastic spring element is arranged on a side of the first elastic spring element facing away from the working chamber.

9. The hydramount according to claim 8, wherein the first elastic spring element, the supporting bearing, the bearing member and the partition delimit the working chamber.

10. The hydramount according to claim 1, wherein the second elastic spring element is arranged on a side of the first elastic spring element facing the working chamber, the second elastic spring element, the supporting bearing, the bearing member and the partition delimiting the working chamber.

11. The hydramount according to claim 1, wherein the second damping opening is substantially formed in the shape of a rolling diaphragm.

12. The hydramount according to claim 1, wherein the second elastic spring element has a smaller longitudinal sectional area than the first elastic spring element.

13. The hydramount according to claim 1, wherein the second damping opening is arranged radially between the second supporting body and the chambers.

14. The hydramount according to claim 1, wherein the second damping opening is arranged radially between the first supporting body and the chambers.

15. The hydramount according to claim 1, further comprising a first control element arranged between the working chamber and the compensating chamber, the first control element being configured to arrange first bypass into an open position to absorb vibrations.

16. The hydramount according to claim 15, wherein the partition includes a clamping disk, the clamping disk being switchable by the first control element, the clamping disk being operable by an engaging piece connected to the first control element.

17. The hydramount according to claim 1, further comprising a second bypass arranged between the chambers, the second bypass being configured to fluidly connect the chambers with each other, the second bypass being closable by a second control element.

18. A hydramount, comprising:

a supporting bearing including an internal first supporting body encircled by an external second supporting body at a radial distance;

a member bearing;

a substantially frustoconical, first elastic spring element formed of elastomeric material, the supporting bearing and the member bearing supported on each other by the first elastic spring element;

a second elastic spring element;

a working chamber; and a compensating chamber, the working chamber and the compensating chamber filled with hydraulic fluid, separated from each other by a partition and in fluid communication via a first damping opening;

wherein the first supporting body and the second supporting body are connected by the first elastic spring element and the second elastic spring element, the first elastic spring element and the second elastic spring element delimiting at least two chambers filled with hydraulic fluid, the at least two chambers positioned transversely to an axis, substantially in diametric opposition to each other in a radial direction, and in fluid communication via at least one second damping opening.

* * * * *